(12) United States Patent
Lu et al.

(10) Patent No.: US 11,190,243 B2
(45) Date of Patent: Nov. 30, 2021

(54) CONTROL DEVICE, NETWORK NODE AND METHODS FOR ALLOCATING RESOURCES

(71) Applicant: Huawei Technologies Co., Ltd., Shenzhen (CN)

(72) Inventors: Xiaojia Lu, Kista (SE); Anders Dahlen, Kista (SE); Gunnar Peters, Kista (SE); Per Tengkvist, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 57 days.

(21) Appl. No.: 16/716,291

(22) Filed: Dec. 16, 2019

(65) Prior Publication Data

US 2020/0119784 A1   Apr. 16, 2020

Related U.S. Application Data

(63) Continuation of application No. PCT/EP2017/064757, filed on Jun. 16, 2017.

(51) Int. Cl.
*H04B 7/0456* (2017.01)
*H04B 7/06* (2006.01)
(Continued)

(52) U.S. Cl.
CPC ......... *H04B 7/0456* (2013.01); *H04B 7/0639* (2013.01); *H04L 1/0643* (2013.01); *H04L 1/0668* (2013.01); *H04L 25/0242* (2013.01)

(58) Field of Classification Search
CPC ... H04B 7/0456; H04B 7/0639; H04L 1/0643; H04L 1/0668; H04L 25/0242;
(Continued)

(56) References Cited

U.S. PATENT DOCUMENTS 9,204,450 B2   12/2015   Moilanen et al.
9,265,050 B2   2/2016   Viswanathan et al.
(Continued)

FOREIGN PATENT DOCUMENTS

CN   102958183 A   3/2013
WO   2012108573 A1   8/2012

OTHER PUBLICATIONS

Chae et al., "Interference Aware-Coordinated Beamforming in a Multi-Cell System," IEEE Transactions on Wireless Communications, IEEE Service Center, vol. 11, No. 10, XP011469676, pp. 3692-3703, Institute of Electrical and Electronics Engineers, New York, New York (Oct. 2012).

*Primary Examiner* — Fitwi Y Hailegiorgis
(74) *Attorney, Agent, or Firm* — Leydig, Voit & Mayer, Ltd.

(57) ABSTRACT

A control device for a wireless communication system is configured to obtain a first channel estimation for a first client device and a second channel estimation for a second client device, to allocate a common resource block (RB) for concurrent wireless transmission between a first network node and the first client device using a first radio access technology (RAT) and between a second network node and the second client device using a second RAT based on the first channel estimation and the second channel estimation. The control device is further configured to allocate a first precoder for the common RB for the first client device and a second precoder for the common RB for the second client device. The first precoder and the second precoder are configured for spatially multiplexing the concurrent wireless transmission.

18 Claims, 12 Drawing Sheets

(51) Int. Cl.
*H04L 1/06* (2006.01)
*H04L 25/02* (2006.01)

(58) Field of Classification Search
CPC ... H04L 5/0053; H04L 5/0048; H04L 5/0076; H04L 25/03974; H04L 25/03904; H04L 25/0202; H04L 5/0073; H04J 11/0053
USPC .......................................... 375/267; 370/329
See application file for complete search history.

(56) References Cited

U.S. PATENT DOCUMENTS

| | | |
|---|---|---|
| 2013/0229941 A1 | 9/2013 | Huang et al. |
| 2015/0043450 A1 | 2/2015 | Ariyavisitakul et al. |
| 2015/0092893 A1* | 4/2015 | Tabet .................. H04L 27/2647 375/340 |
| 2015/0124743 A1* | 5/2015 | Damnjanovic ....... H04L 5/0032 370/329 |
| 2016/0037511 A1 | 2/2016 | Vincze et al. |
| 2019/0245665 A1 | 8/2019 | Wu et al. |

* cited by examiner

CONTROL DEVICE, NETWORK NODE AND METHODS FOR ALLOCATING RESOURCES

CROSS-REFERENCE TO RELATED APPLICATIONS

This application is a continuation of International Application No. PCT/EP2017/064757, filed on Jun. 16, 2017, the disclosure of which is hereby incorporated by reference in its entirety.

TECHNICAL FIELD

The invention relates to a control device and a network node. Furthermore, the invention also relates to corresponding methods and a computer program.

BACKGROUND

Spectrum is one of the most important resources in wireless communication systems. As the wireless data traffic is growing fast additional spectrum will be needed and the need to utilize the spectrum efficiently will increase. In most countries spectrum may be used for any radio access technology (RAT). Already acquired spectrum may be used for both Long-Term Evolution (LTE) and New Radio (NR). The LTE technology will most likely not be evolved to support above 6 GHz spectrum. However, NR will support sub 6 GHz spectrum, in which LTE is currently deployed (as well as Global System for Mobile Communications (GSM) and Wideband Code Division Multiple Access (WCDMA)). In conventional deployment, each RAT uses different spectrum. This would imply that LTE is deployed in a specific spectrum or a certain part of a spectrum and NR will be deployed in another spectrum or in another part of the spectrum.

New acquired spectrum will be used for NR, but new spectrum below 3 GHz is rare. Therefore, NR will mostly be deployed in high spectrum such as 3.5 GHz and above 6 GHz. To deploy NR also in the lower spectrum frequencies, below 3.5 GHz, re-farming of the lower spectrum from GSM, WCDMA or LTE to NR is required. Re-farming spectrum from an old technology to a new technology is a tedious and complex work and leads to decreased capacity and coverage for the old technology. Another issue with re-farming spectrum from an old technology to a new technology is that the number of user equipments (UEs) that supports the new technology will initially be lower than the number of UEs that supports the old technology in the spectrum.

The rapid growth in wireless data traffic will also lead to increased requirements on spectrum efficiency. Efficient usage of enlarged spectrum is of great interest and is currently being discussed. The proposal in the 3$^{rd}$ Generation Partnership Project (3GPP) is that LTE and NR should provide the capability of sharing spectrum in time and frequency for each transmission time interval (TTI). This flexible and dynamic re-farming will solve many of the spectrum re-farming issues. However, there is still a need to further increase the spectrum efficiency in future wireless communication systems.

SUMMARY

Embodiments of the present application provide solutions which mitigate or solve drawbacks and problems of conventional solutions.

According to a first aspect of the present application, a control device is provided for a wireless communication system, the control device comprising a processor being configured to:

obtain a first channel estimation for a first client device;
obtain a second channel estimation for a second client device;
allocate a common resource block (RB) for concurrent wireless transmission between a first network node and the first client device using a first radio access technology (RAT) and between a second network node and the second client device using a second RAT based on the first channel estimation and the second channel estimation, wherein the first RAT is different from the second RAT;
allocate a first precoder for the common RB for the first client device and a second precoder for the common RB for the second client device based on at least one of the first channel estimation and second channel estimation, wherein the first precoder and the second precoder are configured to spatially multiplexing the concurrent wireless transmission between the first network node and the first client device and between the second network node and the second client device in the common RB.

The control device may in this disclosure obtain a second channel estimation from one or more second client devices. Based on the obtained one or more second channel estimations the control device selects one or more second client device which is suitable for spatial multiplexing with the first client device. The wording estimation herein can have the meaning estimate.

A RB in this disclosure should be understood to mean a block of resources for wireless transmissions with both time and frequency dimension. A RB may be a physical RB (PRB) of the same size as in the first RAT and/or a PRB of the same size as in the second RAT. A common RB in this disclosure may comprise a mix of PRBs of the first RAT and PRBs of the second RAT. The wording "a RB" does not exclude the use of "one or more RBs" in the control device according to the first aspect within the scope of embodiments of the present application. Hence, the wording "a RB" is not limited to "one RB" only.

That the common RB is allocated based on the first channel estimation and the second channel estimation may herein e.g. mean that the common RB is allocated based on a correlation between the first channel estimation and the second channel estimation.

That the wireless transmission using the first RAT and the wireless transmission using the second RAT are concurrent should in this disclosure be understood to mean that the two wireless transmissions occur concurrently/simultaneously during a pre-defined time interval.

A control device according to the first aspect provides a number of advantages over conventional solutions. An advantage of the present control device is that the frequency resources of a RB can be used by two different RATs at the same time for transmission or for reception. This increases the spectral efficiency compared to conventional solutions that allocates a RB sometime to the first RAT and other time to the second RAT, i.e. shares the RB at different time intervals. It is understood that the first RAT and the second RAT may use all RBs (for one or multiple client devices) in a spectrum block often called component carrier simultaneously, except possibly for a few RBs that is needed for control information.

In an implementation form of a control device according to the first aspect, the processor is further configured to:

receive a first reference signal from the first client device and obtain the first channel estimation based on the first reference signal;

receive a second reference signal from the second client device and obtain the second channel estimation based on the second reference signal;

allocate the common RB if an estimated channel orthogonality between the first channel estimation and the second channel estimation is smaller than a channel orthogonality threshold value.

An advantage with this implementation form is that by using reference signals from the client devices no reference signals need to be transmitted from the network nodes to the client devices. In addition, by comparing the estimated channel orthogonality to a threshold value it is ensured that the first client device and the second client device can be multiplexed in the spatial domain and that a suitable first precoder and second precoder can be determined for the spatial multiplexing. By adding or removing client devices, the client devices that should share a common RB are selected and a proper number of client devices of the first RAT and of the second RAT are selected. It is ensured that the precoding vectors of the selected client devices will be different and that they can be used for spatial multiplexing the selected client devices on the common RB before determining the precoding vectors.

In an implementation form of a control device according to the first aspect, the processor is further configured to receive a first precoder matrix indicator (PMI) from the first client device and obtain the first channel estimation based on the first PMI;

receive a second PMI from the second client device and obtain the second channel estimation based on the second PMI;

allocate the common RB if the first PMI is different from the second PMI.

An advantage with this implementation form is that the PMI which a client device feedback to a network node is the best description of the channel estimation in the client device of the channel from the network node to the client device. The check that the first PMI is different from the second PMI ensures that the first client device and the second device can be spatially multiplexed.

In an implementation form of a control device according to the first aspect, the processor is further configured to allocate a first RB for wireless transmission between the first network node and a client device using the first RAT;

allocate a second RB for wireless transmission between the second network node and a client device using the second RAT.

The client device using the first RAT in this implementation form may be the first client device or any other client device using the first RAT, while the client device using the second RAT may be the second client device or any other client device using the second RAT.

An advantage with this implementation form is that when a client device is a first client device it can use the common RB for data and the allocated first RB, which is part of the first RAT spectrum, for control information, this reduces the amount of common control information in the RAT shared spectrum. Hence, the scheduling which allocates data to RBs becomes easier in this case. The second RAT only needs to know which resource elements in the common RBs that the reference signals of the first RAT uses. The control device only needs to avoid allocating RBs that the first RAT uses for synchronization channel as common RBs. Other RBs can be common RBs in the RAT shared spectrum. When a client device is a second client device it can use the common RB for data and the allocated second RB, which is part of the second RAT spectrum, for control information, and similar advantages are provided.

In an implementation form of a control device according to the first aspect, the first RB, the second RB and the common RB do not overlap in frequency.

An advantage with this implementation form is that the first RB, the second RB and the common RB can be used simultaneously for transmission to different client devices that cannot be spatially multiplexed without interfering each other.

In an implementation form of a control device according to the first aspect, the processor is further configured to allocate the first RB based on the first channel estimation and the second channel estimation;

allocate the second RB based on the first channel estimation and the second channel estimation.

That the first RB and the second RB are allocated based on the first channel estimation and the second channel estimation may herein e.g. mean that the first RB and the second RB are allocated based on a correlation between the first channel estimation and the second channel estimation.

An advantage with this implementation form is that client devices of the first RAT having estimated channels that are not orthogonal to estimated channels of any client devices of the second RAT, and therefore cannot be spatially multiplexed with any client device of the second RAT, can use the first RB. Similarly, client devices of the second RAT having estimated channels that are not orthogonal to estimated channels of any client device of the first RAT, and therefore cannot be spatially multiplexed with any client device of the first RAT, can use the second RB. The allocation of client device(s) to the first RB can be a local decision of the network node of the first RAT, and the allocation of client device(s) to the second RB can be a local decision of the network node of the second RAT. This local allocation of client devices can be done independently and allows parallel computing decision for scheduling of RBs of the system.

In an implementation form of a control device according to the first aspect, the processor is further configured to allocate the common RB for payload transmission between the first network node and the first client device using the first RAT.

An advantage with this implementation form is that since payload data is point to point transmission (i.e. dedicated transmission), the payload transmission from the first network node to the first client device on the common RB can be performed without interfering with transmissions with other client devices that are receiving from the first network node on the same common RB simultaneously. Similarly, the payload transmission to the first network node from the first client device on the common RB can be performed without interfering with transmissions of other client devices that are transmitting to the first network node on the same common RB simultaneously. The precoding can be designed such that these other client devices get low interference.

In an implementation form of a control device according to the first aspect, the processor is further configured to allocate the first RB for transmission of control information between the first network node and the first client device using the first RAT, the control information being associated with the payload transmission between the first network node and the first client device in the common RB.

An advantage with this implementation form is that if the first RB is on a spectrum of the first RAT then the spectrum shared between the first RAT and the second RAT will need reduced control information. The scheduling allocating data to RBs becomes easier since the second RAT only needs to know which resource elements in the RBs that the reference signals of the first RAT uses. The control device only needs to avoid allocating RBs that the first RAT uses for synch channel as common RBs. Other RBs can be common RBs in the RAT shared spectrum. Another advantage is that control information that the client device use may be common control information that is point to multi-point transmission, which is not suitable for spatially multiplexing.

In an implementation form of a control device according to the first aspect, the processor is further configured to allocate the second RB for transmission of control information between the second network node and the first client device using the second RAT, the control information being associated with the payload transmission between the first network node and the first client device in the common RB.

An advantage with this implementation form is that if the second RB is on a spectrum of the second RAT then the spectrum shared between the first RAT and the second RAT will need reduced control information. The scheduling allocating data to RBs becomes easier, since the first RAT only needs to know which resource elements in the RBs that the reference signals of the second RAT uses. The control device only needs to avoid allocating RBs that the second RAT uses for synch channel as common RBs. Other RBs can be common RBs in the RAT shared spectrum.

In an implementation form of a control device according to the first aspect, the processor is further configured to allocate the common RB for payload transmission between the second network node and the second client device using the second RAT.

An advantage with this implementation form is that since payload data is point to point transmission (i.e. dedicated transmission), the payload transmission from the second network node to the second client device on the common RB can be performed without interfering with transmissions of other client devices that are receiving from the second network node on the same common RB simultaneously. Similarly, the payload transmission to the second network node from the second client device on the common RB can be performed without interfering with transmissions of other client devices that are transmitting to the second network node on the same common RB simultaneously. The precoding can be designed such that these other client devices get low interference.

In an implementation form of a control device according to the first aspect, the processor is further configured to allocate the first RB for transmission of control information between the first network node and the second client device using the first RAT, the control information being associated with the payload transmission between the second network node and the second client device in the common RB.

An advantage with this implementation form is that if the first RB is on a spectrum of the first RAT then the spectrum shared between the first RAT and the second RAT will need reduced control information. The scheduling allocating data to RBs becomes easier since the second RAT only needs to know which resource elements in the RBs that the reference signals of the first RAT uses. The control device only needs to avoid allocating RBs that the first RAT uses for synchronization channel as common RBs. Other RBs can be common RBs in the RAT shared spectrum.

In an implementation form of a control device according to the first aspect, the processor is further configured to allocate the second RB for transmission of control information between the second network node and the second client device using the second RAT, the control information being associated with the payload transmission between the second network node and the second client device in the common RB.

An advantage with this implementation form is that if the second RB is on a spectrum of the second RAT then the spectrum shared between the first RAT and the second RAT will need reduced control information. The scheduling allocating data to RBs becomes easier. The first RAT only needs to know which resource elements in the RBs that the reference signals of the second RAT uses. The control device only needs to avoid allocating RBs that the second RAT uses for synchronization channel as common RBs. Other RBs can be common RBs in the RAT shared spectrum.

In an implementation form of a control device according to the first aspect, the processor is further configured to obtain a first transmit power for transmissions in the first RB and in the common RB;

allocate the first transmit power between the first RB and the common RB.

An advantage with this implementation form is that a limited power resource can be shared among first RBs that may be RBs of the first RAT spectrum and common RBs. When the first RAT spectrum needs a small amount of power the common RBs can use more power, and vice versa. When many client devices share the same common RBs more power can be allocated to the common RBs and less power to the first RBs. In this way, power is used more efficiently which increases spectrum efficiency.

In an implementation form of a control device according to the first aspect, the processor is further configured to obtain a second transmit power for transmissions in the second RB and in the common RB;

allocate the second transmit power between the common RB and the second RB.

An advantage with this implementation form is that limited power resources can be shared among second RBs that may be RBs of the second RAT spectrum and common RBs. When the second RAT spectrum needs a small amount of power the common RBs can use more power, and vice versa. When many client devices share the same common RBs more power can be allocated to the common RBs and less power to the second RBs. In this way, power is used more efficiently which increase spectrum efficiency.

In an implementation form of a control device according to the first aspect, the processor is further configured to obtain a total transmit power for transmissions in the first RB, in the second RB, and in the common RB;

allocate total transmit power between first RB, the common RB, and the second RB.

An advantage with this implementation form is that limited power resources can be shared among first RBs that can be of the first RAT spectrum and second RBs that may be RBs of the second RAT spectrum and common RBs that may be of the RAT shared spectrum. In this way, power is used more efficiently which increase spectrum efficiency.

In an implementation form of a control device according to the first aspect, the first RAT is evolved universal terrestrial radio access (E-UTRA) and the second RAT is NR.

An advantage with this implementation form is that both the first RAT and the second RAT have similar physical layer and their physical layer is suitable for spatially multiplexing. Moreover, they are likely to have PMIs that are comparable. In the re-farming problem described initially it is more problematic to re-farm LTE spectrum, since it is the latest technology and the demand for its access is likely to be large for a long time ahead.

According to a second aspect of the present application, the above mentioned and other objectives are achieved with a network node for a wireless communication system, the network node comprising a processor configured to receive an allocation of a common RB for concurrent wireless transmission between the network node and a first client device using a first RAT, or between the network node and a second client device using a second RAT, wherein the first RAT is different from the second RAT;

receive an allocation of a first precoder or a second precoder for the common RB, wherein the first precoder and the second precoder are configured to spatially multiplexing concurrent wireless transmission in the common RB;

a transceiver configured to perform wireless transmission with the first client device in the common RB using the first RAT and the first precoder, or perform wireless transmission with the second client device in the common RB using the second RAT and the second precoder.

A network node according to the second aspect provides a number of advantages over conventional solutions. An advantage of the present network node is that the allocation of data to be transmitted on the common RB can be a local decision of the network node of the first and the second RAT, respectively. This local allocation of data can be done independently and allows parallel computing decision for the scheduling. The allocation of data typically also includes determining code rates to be used in the transmission.

According to a third aspect of the present application, the above mentioned and other objectives are achieved with a method for a control device, the method comprises obtaining a first channel estimation for a first client device;

obtaining a second channel estimation for a second client device;

allocating a common Resource Block, RB, for concurrent wireless transmission between a first network node and the first client device using a first Radio Access Technology, RAT, and between a second network node and the second client device using a second RAT based on the first channel estimation and the second channel estimation, wherein the first RAT is different from the second RAT;

allocating a first precoder for the common RB for the first client device and a second precoder for the common RB for the second client device based on at least one of the first channel estimation and second channel estimation, wherein the first precoder and the second precoder are configured to spatially multiplexing the concurrent wireless transmission between the first network node and the first client device and between the second network node and the second client device in the common RB.

In an implementation form of a method according to the third aspect, the method further comprises receiving a first reference signal from the first client device and obtain the first channel estimation based on the first reference signal;

receiving a second reference signal from the second client device and obtain the second channel estimation based on the second reference signal;

allocating the common RB if an estimated channel orthogonality between the first channel estimation and the second channel estimation is smaller than a channel orthogonality threshold value.

In an implementation form of a method according to the third aspect, the method further comprises receiving a first Precoder Matrix Indicator, PMI, from the first client device and obtain the first channel estimation based on the first PMI;

receiving a second PMI from the second client device and obtain the second channel estimation based on the second PMI;

allocating the common RB if the first PMI is different from the second PMI.

In an implementation form of a method according to the third aspect, the method further comprises allocating a first RB for wireless transmission between the first network node and a client device using the first RAT;

allocating a second RB for wireless transmission between the second network node and a client device using the second RAT.

In an implementation form of a method according to the third aspect, the first RB, the second RB and the common RB do not overlap in frequency.

In an implementation form of a method according to the third aspect, the method further comprises allocating the first RB based on the first channel estimation and the second channel estimation;

allocating the second RB based on the first channel estimation and the second channel estimation.

In an implementation form of a method according to the third aspect, the method further comprises allocating the common RB for payload transmission between the first network node and the first client device using the first RAT.

In an implementation form of a method according to the third aspect, the method further comprises allocating the first RB for transmission of control information between the first network node and the first client device using the first RAT, the control information being associated with the payload transmission between the first network node and the first client device in the common RB.

In an implementation form of a method according to the third aspect, the method further comprises allocating the second RB for transmission of control information between the second network node and the first client device using the second RAT, the control information being associated with the payload transmission between the first network node and the first client device in the common RB.

In an implementation form of a method according to the third aspect, the method further comprises allocating the common RB for payload transmission between the second network node and the second client device using the second RAT.

In an implementation form of a method according to the third aspect, the method further comprises allocating the first RB for transmission of control information between the first network node and the second client device using the first RAT, the control information being associated with the payload transmission between the second network node and the second client device in the common RB.

In an implementation form of a method according to the third aspect, the method further comprises allocating the second RB for transmission of control information between the second network node and the second client device using the second RAT, the control information being associated with the payload transmission between the second network node and the second client device in the common RB.

In an implementation form of a method according to the third aspect, the method further comprises obtaining a first transmit power for transmissions in the first RB and in the common RB;

allocating the first transmit power between the first RB and the common RB.

In an implementation form of a method according to the third aspect, the method further comprises obtaining a second transmit power for transmissions in the second RB and in the common RB;

allocating the second transmit power between the common RB and the second RB.

In an implementation form of a method according to the third aspect, the method further comprises obtaining a total transmit power for transmissions in the first RB, in the second RB, and in the common RB;

allocating total transmit power between first RB, the common RB, and the second RB.

In an implementation form of a method according to the third aspect, the first RAT is E-UTRA and the second RAT is NR.

The advantages of the methods according to the third aspect are the same as those for the corresponding device claims according to the first aspect.

According to a fourth aspect of the present application, the above mentioned and other objectives are achieved with a method for a network node, the method comprises receiving an allocation of a common RB for concurrent wireless transmission between the network node and a first client device using a first RAT, or between the network node and a second client device using a second RAT, wherein the first RAT is different from the second RAT;

receiving an allocation of a first precoder or a second precoder for the common RB, wherein the first precoder and the second precoder are configured to spatially multiplexing concurrent wireless transmission in the common RB;

performing wireless transmission with the first client device in the common RB using the first RAT and the first precoder, or performing wireless transmission with the second client device in the common RB using the second RAT and the second precoder.

The advantages of the methods according to the fourth aspect are the same as those for the corresponding network node claims according to the second aspect.

The present application also relates to a computer program, characterized in code means, which when run by processing means causes said processing means to execute any method according to the present application. Further, the present application also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM), and hard disk drive.

Further applications and advantages of the present application will be apparent from the following detailed description.

BRIEF DESCRIPTION OF THE DRAWINGS

The appended drawings are intended to clarify and explain different embodiments of the present invention, in which.

DETAILED DESCRIPTION

Figure 1:
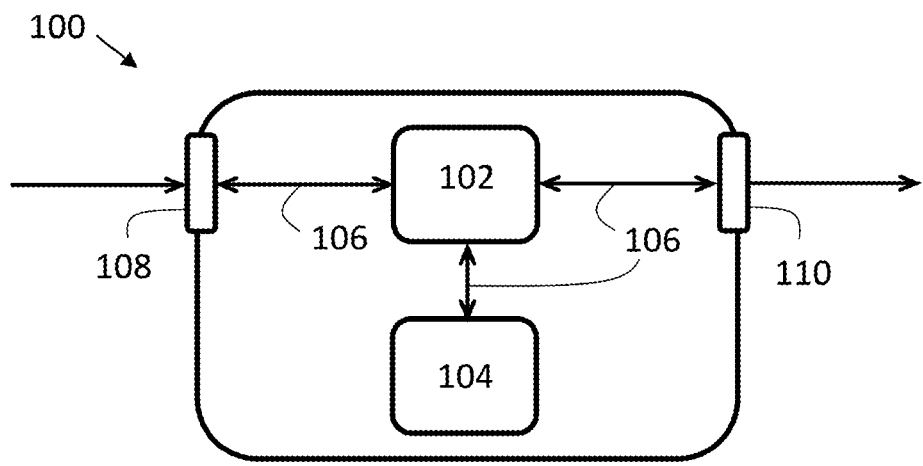
FIG. 1 shows a control device according to an embodiment of the invention.

FIG. 1 shows a control device 100 according to an embodiment of the invention. In the embodiment shown in FIG. 1, the control device 100 comprises a processor 102 coupled to a memory 104 with coupling/communication means 106 known in the art. The control device 100 further comprises input means 108 and output means 110, which are both coupled to the processor 102 with coupling/communication means 106 known in the art. In an embodiment, the processor 102 may be a dedicated processor configured to execute the methods according to the present application only. In some embodiments, the processor 102 may instead be shared with another network device, such as a network node 300a; 300b (shown in FIG. 3), and perform additional processing.

The control device 100 may be a standalone device or may be part of another network device. For example, the control device 100 may be an integrated part of a network node, such as the network node 300a; 300b. That the control device 100 is configured to perform certain actions should in this disclosure be understood to mean that the control device 100 comprises suitable means, such as e.g. the processor 102, configured to perform said actions.

Figure 5:
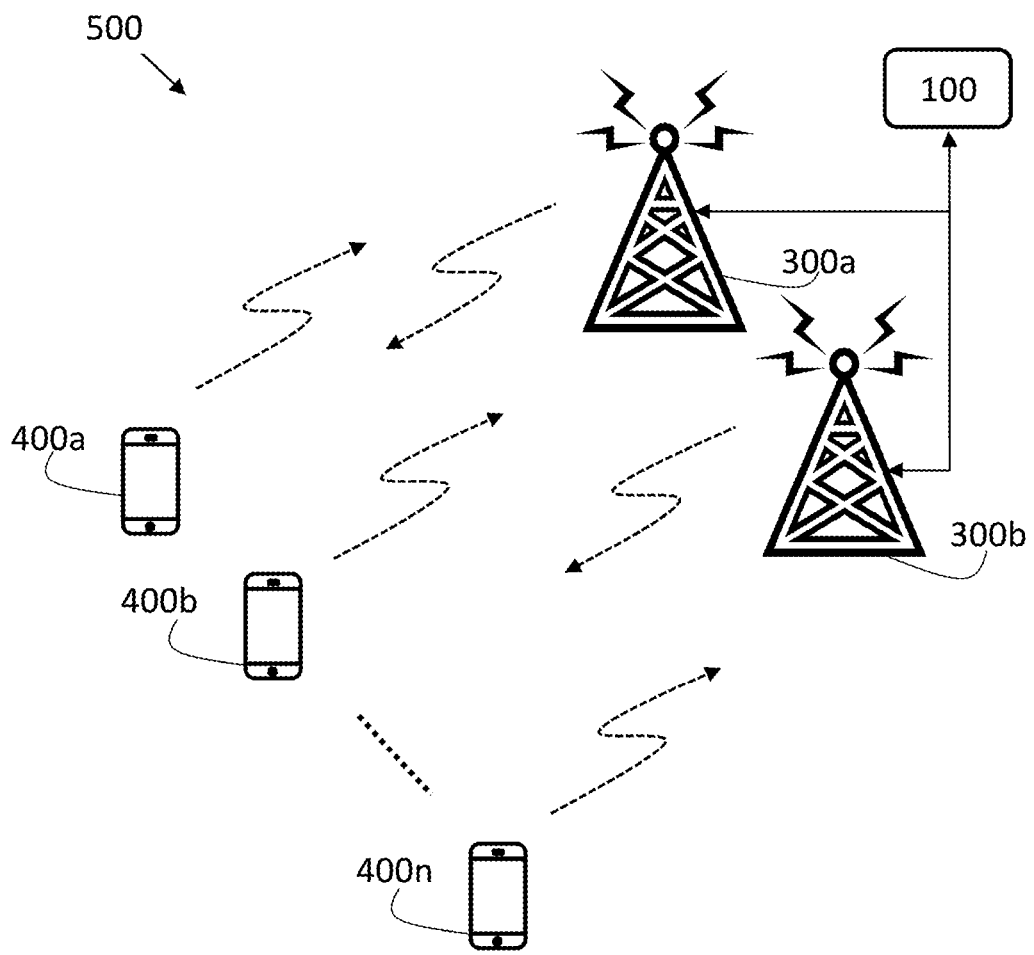
FIG. 5 shows a wireless communication system according to an embodiment of the invention.

The control device 100 is configured to obtain a first channel estimation for a first client device 400a (shown in FIG. 5) and obtain a second channel estimation for a second client device 400b (shown in FIG. 5). The control device 100 may be configured to obtain the second channel estimation for the second client device 400b from a set of one or more channel estimations obtained for one or more client devices 400b, . . . , 400n, different from the first client device 400a. The control device 100 is further configured to allocate a common Resource Block (RB) for concurrent/simultaneous wireless transmission between a first network node 300a and the first client device 400a using a first RAT and between a second network node 300b and the second client device 400b using a second RAT based on a correlation between the first channel estimation and the second channel estimation. The first RAT is different from the second RAT. Furthermore, the control device 100 is configured to allocate a first precoder for the common RB for the first client device 400a and a second precoder for the common RB for the second client device 400b based on at least one of the first channel estimation and second channel estimation. The first precoder and the second precoder are configured to spatially multiplexing the concurrent wireless transmission between the first network node 300a and the first client device 400a and between the second network node 300b and the second client device 400b in the common RB.

Figure 2:
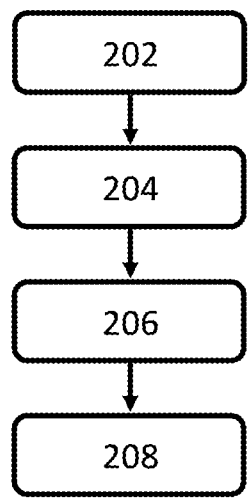
FIG. 2 shows a method according to an embodiment of the invention.

FIG. 2 shows a flow chart of a corresponding method 200 which may be executed in a control device 100, such as the one shown in FIG. 1. The method 200 comprises obtaining 202 a first channel estimation for a first client device 400a and obtaining 204 a second channel estimation for a second client device 400b. The method further comprises allocating 206 a common RB for concurrent wireless transmission between a first network node 300a and the first client device 400a using a first RAT and between a second network node 300b and the second client device 400b using a second RAT based on a correlation between the first channel estimation and the second channel estimation. The first RAT is different from the second RAT. Furthermore, the method 200 comprises allocating 208 a first precoder for the common RB for the first client device 400a and a second precoder for the common RB for the second client device 400b based on at least one of the first channel estimation and second channel estimation. The first precoder and the second precoder are configured to spatially multiplexing the concurrent wireless transmission between the first network node 300a and the first client device 400a and between the second network node 300b and the second client device 400b in the common RB.

Figure 3:
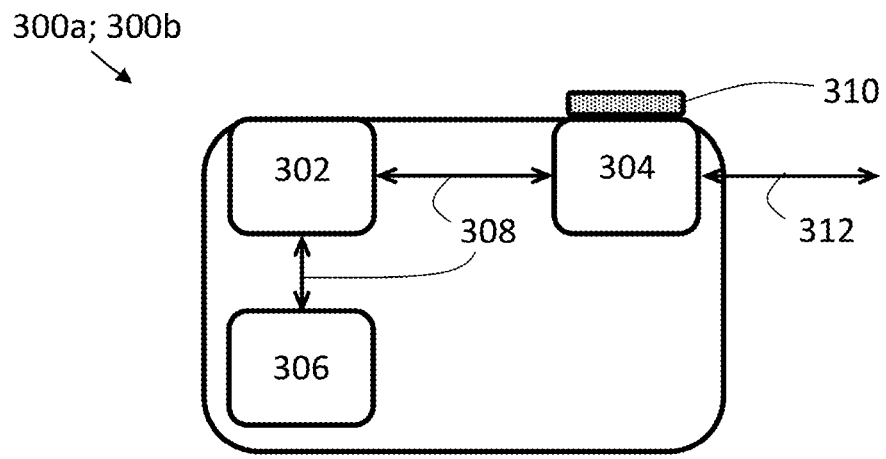
FIG. 3 shows a network node according to an embodiment of the invention.

FIG. 3 shows a network node 300a; 300b according to an embodiment of the invention. In the embodiment shown in FIG. 3, the network node 300 comprises a processor 302, a transceiver 304 and a memory 306. The processor 302 is coupled to the transceiver 304 and the memory 306 by communication means 308 known in the art. The network node 300a; 300b can be configured for both wireless and wired communications in wireless and wired communication systems, respectively. The wireless communication capability is provided with an antenna 310 coupled to the transceiver 304, while the wired communication capability is provided with a wired communication interface 312 coupled to the transceiver 304.

That the network node 300a; 300b is configured to perform certain actions should in this disclosure be understood to mean that the network node 300a; 300b comprises suitable means, such as e.g. the processor 302 or the transceiver 304, configured to perform said actions.

The network node 300a; 300b is configured to receive an allocation of a common RB for concurrent wireless transmission between the network node 300a; 300b and a first client device 400a using a first RAT, or between the network node 300a; 300b and a second client device 400b using a second RAT. The first RAT is different from the second RAT. The network node 300a; 300b is further configured to receive an allocation of a first precoder or a second precoder for the common RB. The first precoder and the second precoder are configured to spatially multiplexing concurrent wireless transmission in the common RB. The network node 300a; 300b is further configured to perform wireless transmission with the first client device 400a in the common RB using the first RAT and the first precoder, or perform wireless transmission with the second client device 400b in the common RB using the second RAT and the second precoder.

Figure 4:
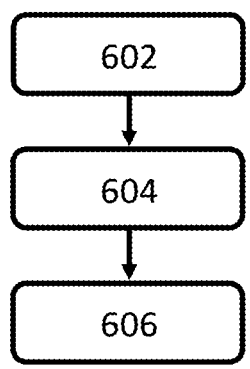
FIG. 4 shows a method according to an embodiment of the invention.

FIG. 4 shows a flow chart of a corresponding method 600 which may be executed in a network node 300a; 300b, such as the one shown in FIG. 3. The method 600 comprises receiving 602 an allocation of a common RB for concurrent wireless transmission between the network node 300a; 300b and a first client device 400a using a first RAT, or between the network node 300a; 300b and a second client device 400b using a second RAT. The first RAT is different from the second RAT. The method further comprises receiving 604 an allocation of a first precoder or a second precoder for the common RB. The first precoder and the second precoder are configured to spatially multiplexing concurrent wireless transmission in the common RB. The method further comprises performing 606 wireless transmission with the first client device 400a in the common RB using the first RAT and the first precoder, or with the second client device 400b in the common RB using the second RAT and the second precoder.

FIG. 5 shows a wireless communication system 500 according to an embodiment. The wireless communication system 500 comprises a control device 100 connected to a first network node 300a and a second network node 300b, respectively. In the embodiment shown in FIG. 5 the control device 100 is a standalone device. However, the control device 100 may in some embodiments instead be integrated with either the first network node 300a or the second network node 300b. For simplicity, the wireless communication system 500 shown in FIG. 5 comprises one control device 100 and two network nodes 300a, 300b. However, the wireless communication system 500 may comprise any number of control devices 100 and any number of network nodes 300a; 300b without deviating from the scope of the present application.

The wireless communication system 500 further comprises a plurality of client devices 400a, 400b, . . . , 400n which are configured to exchange wireless transmissions with the network nodes 300a, 300b. In this non-limiting embodiment, the first network node 300a performs wireless transmissions using the first RAT, while the second network node 300b performs wireless transmissions using the second RAT. The control device 100 may allocate a common RB in the wireless communication system 500 for concurrent wireless transmission using the first RAT and the second RAT. The control device 100 decides whether to allocated a common RB or not based on channel estimations for the client devices 400a, 400b, . . . , 400n.

In an embodiment the control device 100 obtains the channel estimations for the client devices 400a, 400b, . . . , 400n based on reference signals from the client devices 400a, 400b, . . . , 400n. In such an embodiment, the control device 100 is configured to receive a first reference signal(s) from the first client device 400a and obtain the first channel estimation based on the first reference signal. The control device 100 is further configured to receive a second reference signal(s) from the second client device 400b and obtain the second channel estimation based on the second reference signal. Furthermore, the control device 100 is configured to allocate a common RB if an estimated channel orthogonality between the first channel estimation and the second channel estimation is smaller than a channel orthogonality threshold value. It is to be noted that the reference signals can be received from the client devices via one or more intermediate communication devices, such as network nodes.

Figure 6:
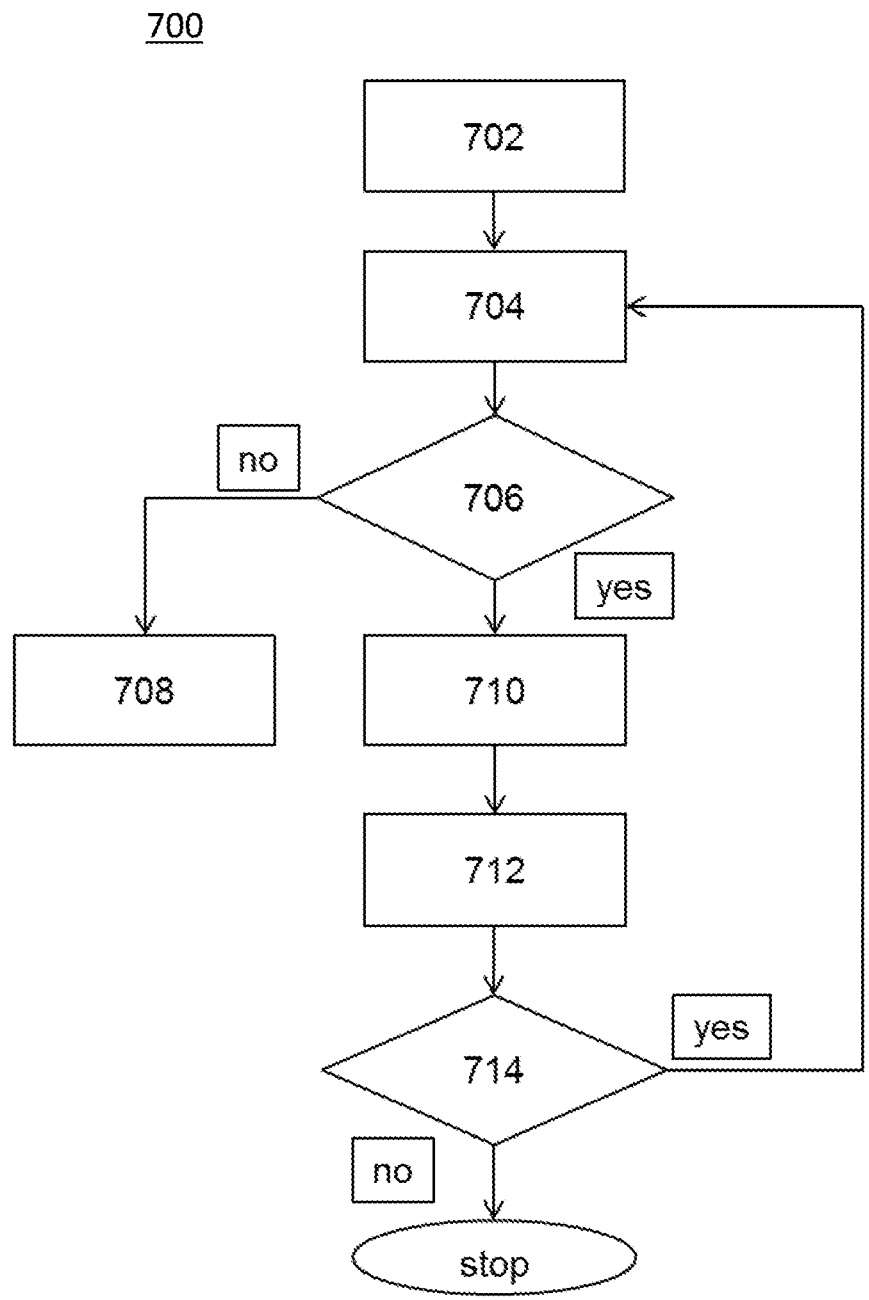
FIG. 6 shows a flow chart according to an embodiment of the invention.

FIG. 6 shows a flow chart of a method 700 in which the control device 100 obtains the channel estimations based on reference signals. In the first step 702 the control device 100 receives a first reference signal from a first client device 400a and a second reference signal from a second client device 400b. The second reference signal from the second client device 400b may be received from a set of one or more reference signals received from one or more client devices 400b, . . . , 400n, different from the first client device 400a. The control device 100 may receive the first reference signal and second reference signal either directly form the respective client device 400a; 400b or via other nodes, e.g. from the network nodes 300a, 300b, as previously mentioned. In an embodiment, the first reference signal and the second reference signal may e.g. be sounding reference signals (SRS) in the uplink from the first client device 400a and the second client device 400b, respectively.

In step 704 the control node 100 then obtains the first channel estimation and the second channel estimation based on the received first reference signal and the received second reference signal, respectively. The first channel estimation and the second channel estimation may be obtained by computations based on/using the received first reference signal and the received second reference signal, respectively. The computations may e.g. be based on channel vector measurements for the first client device 400a and the second client device 400b, respectively, i.e. estimations of channel vector elements. The number of channel vector elements in the channel vectors may be two or more. The channel estimation determines how the signal from different transmission antennas is propagated and changed over the air before reception and how signal from different transmitting antenna elements are received.

Once the first channel estimation and the second channel estimation are obtained by the control device 100, an estimated channel orthogonality between the first channel estimation and the second channel estimation is computed and compared to a channel orthogonality threshold value, in step 706. The channel orthogonality threshold value is used to indicate how uncorrelated the channels of first client device 400a and the channels of the second client device 400b are. If the estimated channel orthogonality is larger than the channel orthogonality threshold value then the channels of the first client device 400a and the channels of the second client device 400b are too correlated and therefore the first client device 400a and the second client device 400b cannot be spatially multiplexed. In this case, the method 700 moves on to step 708 where conventional allocation of RBs is performed. According to the conventional allocation of RBs the first client device 400a is allocated a first RB for wireless transmission using the first RAT and the second client device 400b is allocated a second RB for wireless transmission using the second RAT. The first RB and the second RB are separated either in frequency or in time. However, if the estimated channel orthogonality is smaller than the channel orthogonality threshold value then the first client device 400a and the second client device 400b can be spatially multiplexed and the method 700 moves on to step 710 where a common RB is allocated.

In step 712, the first client device 400a and the second client device 400b are paired and mapped to different transmission layers. A first precoder for the common RB is allocated for the first client device 400a and a second precoder for the common RB is allocated for the second client device 400b. In addition, power allocation per RB is performed, which will be described below with reference to FIG. 13.

A check is performed in step 714 to see if there are available RBs for allocation and if the first client device 400a and the second client device 400b have data to send. If the answer to the check in step 714 is yes, the method 700 moves to step 704 to obtain new channel estimations. On the other hand, if there are no available RBs or no additional data to send then the method 700 is stopped.

The method 700 has been described in an embodiment with two client devices 400a, 400b. However, the method 700 may in embodiments be performed using the input from more than two client devices 400a, 400b, . . . , 400n. In such an embodiment, one first reference signal and at least two second reference signal may be received in step 702 and used to obtain one first channel estimation and at least two second channel estimations in step 704. The estimated channel orthogonality computed in step 706 is based on all the obtained channel estimations, such that if the estimated channel orthogonality between at least two client devices 400a, 400b, . . . , 400n is smaller than the channel orthogonality threshold they are allocated a common RB in step 710. At the same time, any client device 400a, 400b, . . . , 400n which do not have enough orthogonality to any one of the client devices 400a, 400b, . . . , 400n allocated to the common RB are, in step 708, allocated a first RB or a second RB depending on the RAT used by the client device 400a; 400b; . . . ; 400n.

In an embodiment the control device 100 obtains the channel estimations for the client devices 400a, 400b, . . . , 400n based on Precoder Matrix Indicators (PMIs) from the client devices 400a, 400b, . . . , 400n. In such an embodiment, the control device 100 is configured to receive a first PMI from the first client device 400a and obtain the first channel estimation based on the first PMI. The control device 100 is further configured to receive a second PMI from the second client device 400b and obtain the second channel estimation based on the second PMI. Furthermore, the control device 100 is configured to allocate the common RB if the first PMI is different from the second PMI.

Figure 7:
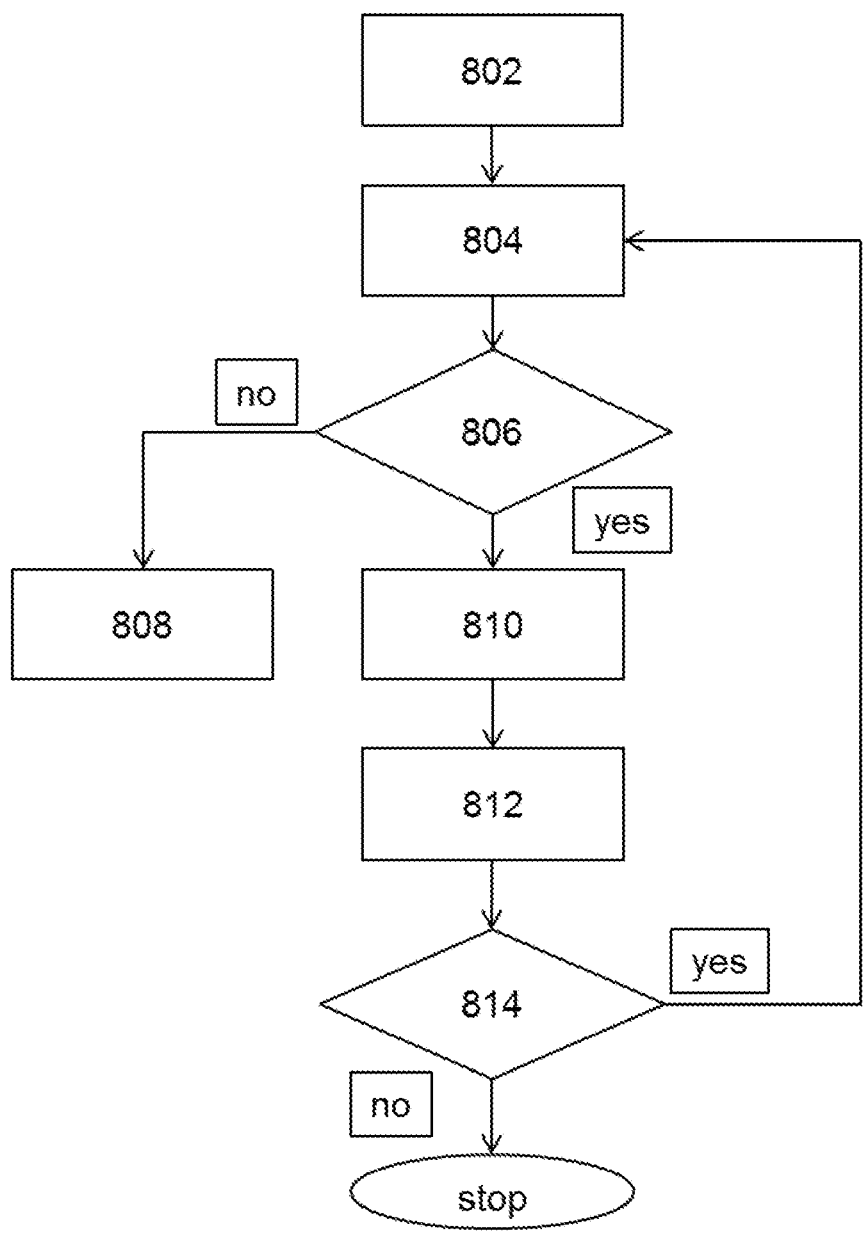
FIG. 7 shows a flow chart according to an embodiment of the invention.

FIG. 7 shows a flow chart of a method 800 where the control device 100 obtains the channel estimations based on PMIs. In the first step 802 the control device 100 receives a first PMI from the first client device 400a and a second PMI from the second client device 400b. The second PMI from the second client device 400b may be received from a set of one or more PMIs received from one or more client devices 400b, . . . , 400n, different from the first client device 400a. The control device 100 may receive the first and second PMIs either directly from the respective client device 400a; 400b or via other nodes, e.g. from the network nodes 300a, 300b.

In step 804 the control node 100 obtains the first channel estimation and the second channel estimation based on the received first PMI and the received second PMI, respectively. The first channel estimation and the second channel estimation may be obtained by computations based on and/or using the received first PMI and the received second PMI, respectively. In an embodiment, the first channel estimation and the second channel estimation may correspond directly to the received first PMI and the received second PMI, respectively.

When the first channel estimation and the second channel estimation have been obtained by the control device 100, a check between the first channel estimation and the second channel estimation is performed in step 806. If the first channel estimation and the second channel estimation are the same, the first client device 400a and the second client device 400b cannot be spatially multiplexed since this implies that there is high correlation between the first client device 400*a* and the second client device 400*b*. In this case, the method 800 moves on to step 808 where conventional allocation of RBs is performed. However, if the first channel estimation and the second channel estimation are not correlated, i.e. the first PMI is different from the second PMI, then the first client device 400*a* and the second client device 400*b* can be spatially multiplexed and the method 800 moves on to step 810 where a common RB is allocated.

In step 812, the first client device 400*a* and the second client device 400*b* are paired and mapped to different transmission layers. A first precoder for the common RB is allocated for the first client device 400*a* and a second precoder for the common RB is allocated for the second client device 400*b*. In addition, power allocation per RB is performed, which will be described in below with reference to FIG. 13.

A check is performed in step 814 to see if there are available RBs for allocation and if the first client device 400*a* and the second client device 400*b* have data to send. If the answer to the check in step 814 is yes, the method 800 moves to step 804 to obtain new channel estimations. On the other hand, if there are no available RBs or no additional data to send then the method 800 is stopped.

In a similar way as described above with reference to method 700, the method 800 may in some embodiments be performed using the input from more than two client devices 400*a*, 400*b*, ..., 400*n*. In such an embodiment, one first PMI and at least two second PMIs may be received in step 802 and used to obtain one first channel estimation and at least two second channel estimations in step 804. The check in step 806 is based on all the obtained channel estimations, such that if the channel estimations, typically PMIs in this case, of at least two client devices 400*a*, 400*b*, ..., 400*n* is different then these at least two client devices 400*a*, 400*b*, ..., 400*n* are allocated to a common RB in step 810. At the same time, any client device 400*a*, 400*b*, ..., 400*n* which have the same channel estimation, typically PMI in this case, as any one of the client devices 400*a*, 400*b*, ..., 400*n* allocated to the common RB are, in step 808, allocated a first RB or a second RB depending on the RAT used by the client device 400*a*; 400*b*; ...; 400*n*.

Figure 8:
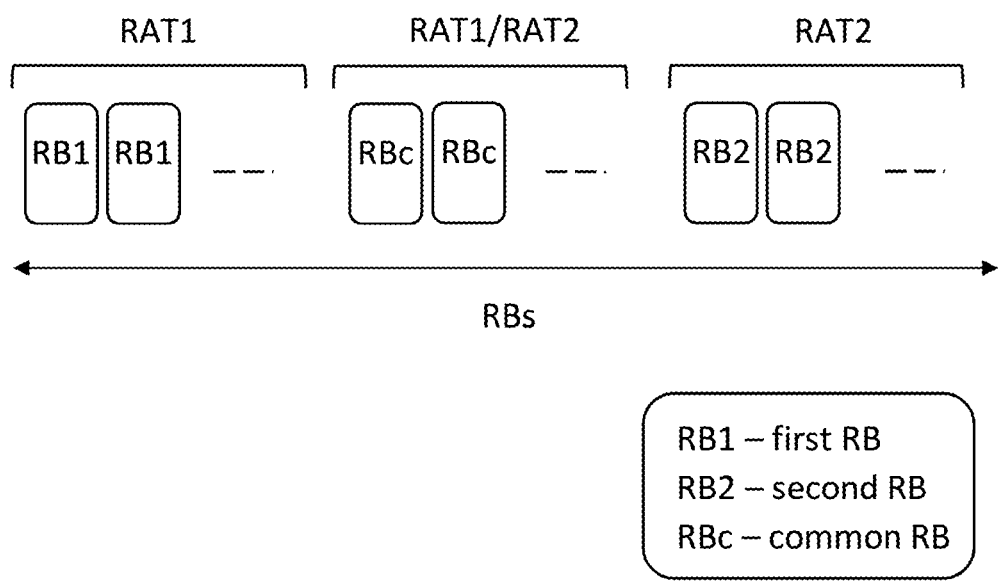
FIG. 8 shows a RB allocation according to an embodiment of the invention.

FIG. 8 shows how different RBs are allocated to the different RATs according to an embodiment. One or more first RBs may be allocated for wireless transmission between the first network node 300*a* and a client device 400*n* using the first RAT. Hence, any of the first RBs may be used for wireless transmission to and from any of client devices 400*a*, 400*b*, ..., 400*n* using the first RAT. Furthermore, one or more second RBs may be allocated for wireless transmission between the second network node 300*b* and a client device 400*n* using the second RAT. Hence, any of the second RBs may be used for wireless transmission to and from any of client devices 400*a*, 400*b*, ..., 400*n* using the second RAT. In addition, one or more common RBs may be allocated for concurrent wireless transmission between the first network node 300*a* and a client device 400*a* using the first RAT and between the second network node 300*b* and a client device 400*b* using the second RAT. According to an embodiment the first RB, the second RB and the common RB do not overlap in frequency as illustrated in FIG. 8.

The first RB may be allocated based on a correlation between the first channel estimation and the second channel estimation. In the same way, the second RB may be allocated based on a correlation between the first channel estimation and the second channel estimation. The correlation may be determined according to one of the methods 700; 800 previously described.

Hence, the first RB may e.g. be allocated to a client device 400*a*, 400*b*, ..., 400*n* of the first RAT in step 708 of the method 700 or step 808 of the method 800 if the outcome of the check in step 706 or 808 is negative. In the same way, the second RB may e.g. be allocated to a client device 400*a*, 400*b*, ..., 400*n* of the second RAT in step 708 of the method 700 or step 808 of the method 800 if the outcome of the check in step 706 or 808 is negative.

FIG. 9 to FIG. 12 show how payload and control information between a network node 300*a*; 300*b* and a client device 400*a*; 400*b* may be distributed over the different types of RBs according to embodiments of the invention. Here the first RB belongs to the spectrum of the first RAT and the second RB belongs to the spectrum of the second RAT. Common to the embodiments shown in FIG. 9 to FIG. 12 is that payload is transmitted over the common RB. Some reference signal may also be transmitted on some resource elements of the common RB. Only first RBs and second RBs for synchronization channels are needed in the RAT shared spectrum. This reduces the need to allocate first RBs and second RBs for control information in the RAT shared spectrum. Hence, making the scheduling allocating the RBs easier.

Figure 9:
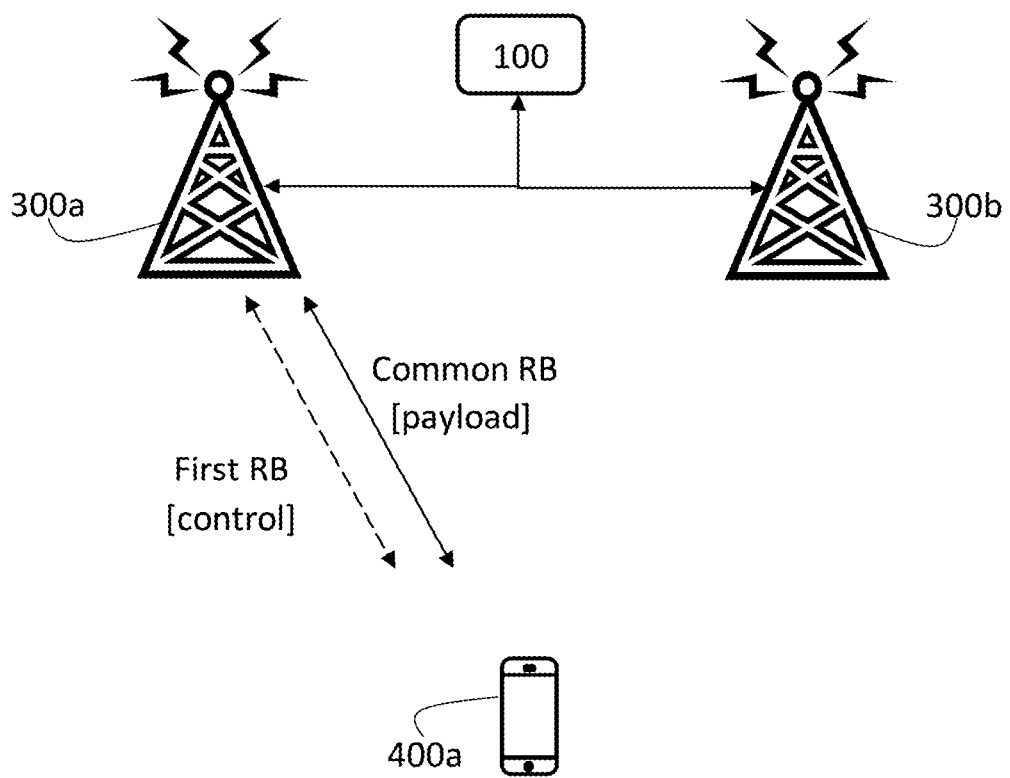
FIG. 9 shows a RB allocation according to an embodiment of the invention.

In FIG. 9, the common RB is allocated for payload transmission between the first network node 300*a* and the first client device 400*a* using the first RAT. The payload information may be any information carrying data traffic to the client device 400*a*. The first RB is allocated for transmission of control information between the first network node 300*a* and the first client device 400*a* using the first RAT. The control information is associated with the payload transmission between the first network node 300*a* and the first client device 400*a* in the common RB. That the control information is associated with the payload transmission means that the control information provides information to the client device 400*a* about how to e.g. receive and decode the payload transmission.

Figure 10:
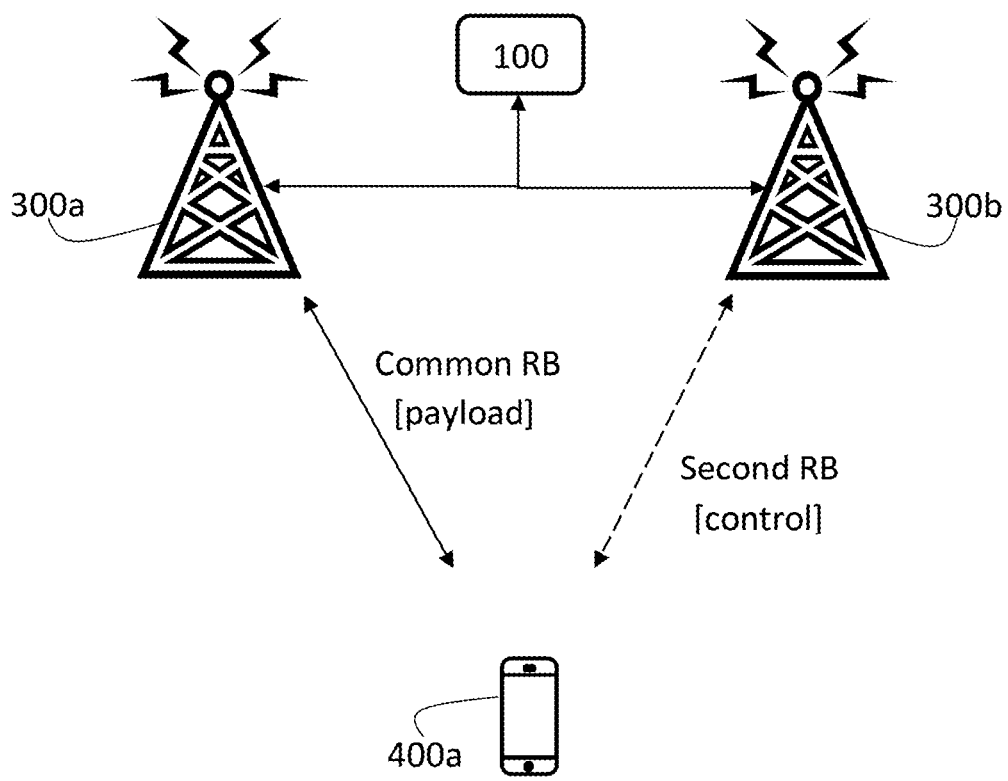
FIG. 10 shows a RB allocation according to an embodiment of the invention.

In FIG. 10, the common RB is still allocated for payload transmission between the first network node 300*a* and the first client device 400*a* using the first RAT. However, the control information is transmitted to and from the second network node 300*b*. Hence, the second RB is allocated for transmission of control information between the second network node 300*b* and the first client device 400*a* using the second RAT. The control information is associated with the payload transmission between the first network node 300*a* and the first client device 400*a* in the common RB.

Figure 11:
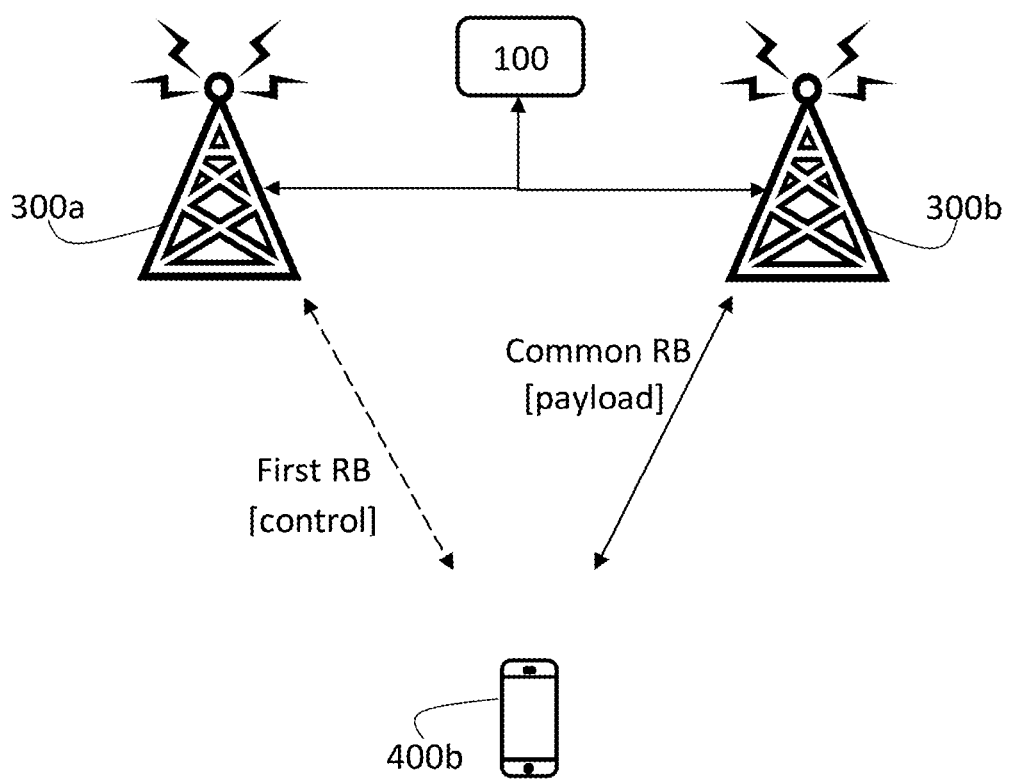
FIG. 11 shows a RB allocation according to an embodiment of the invention.

In FIG. 11 the common RB is allocated for payload transmission between the second network node 300*b* and the second client device 400*b* using the second RAT. The first RB is allocated for transmission of control information between the first network node 300*a* and the second client device 400*b* using the first RAT. The control information is associated with the payload transmission between the second network node 300*b* and the second client device 400*b* in the common RB.

Figure 12:
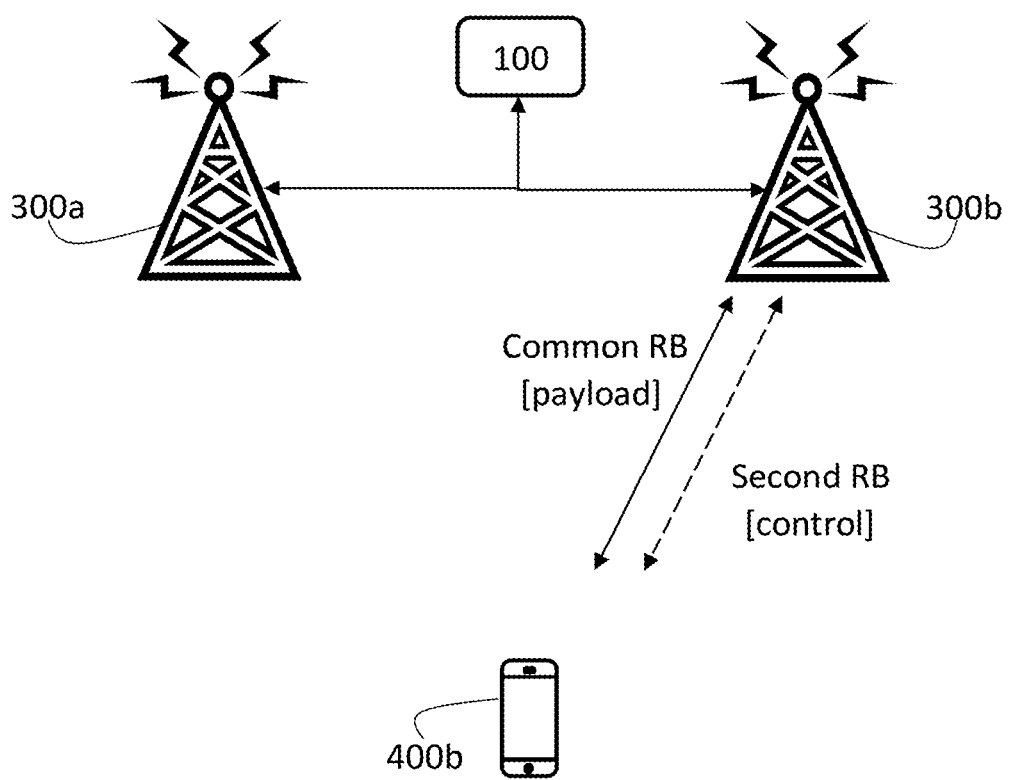
FIG. 12 shows a RB allocation according to an embodiment of the invention.

In FIG. 12 the common RB is still allocated for payload transmission between the second network node 300*b* and the second client device 400*b* using the second RAT. However, the control information is transmitted to and from the second network node 300*b*. Hence, the second RB is allocated for transmission of control information between the second network node 300b and the second client device 400b using the second RAT. The control information is associated with the payload transmission between the second network node 300b and the second client device 400b in the common RB.

The allocation of RBs according to the present application will now be described in an embodiment where the first RAT is LTE, i.e. E-UTRA, and the second RAT is NR. In other embodiments, the first RAT may be LTE or NR while the second RAT may be Wi-Fi, or vice versa. Other possible RATs may e.g. be WCDMA or Bluetooth, and may be combined with any of the previously mentioned RATs. In the embodiment where the first RAT is LTE and the second RAT is NR, a client device is referred to as a UE. According to the present application spatial multiplexing is used to enable UEs to access both LTE and NR bands on top of each other at the same time. Interference between LTE and NR wireless transmissions will be separated in the spatial domain by multiple antenna techniques. This enables single-RAT multiple input multiple output (MIMO) and multi-RAT MIMO to be used at the same time. Single-RAT MIMO is what normally is meant by single-user (SU)-MIMO and multi-user (MU)-MIMO. SU-MIMO implies that one UE can receive and/or transmit on either LTE or NR (not both) on the same RB or multiple RBs. A RB is typically an LTE physical RB (PRB) (180 kHz). MU-MIMO implies that two or more UEs can receive and/or transmit on the same RB fraction(s) (typically LTE PRB(s)) simultaneously and all UEs use the same RAT. Multi-RAT MIMO implies that two or more UEs can receive and/or transmit on the same RB fraction(s) (typically LTE PRB(s)) simultaneously and some UEs use different RAT. In multi-RAT MIMO each UE receiving or transmitting can also get several spatial layers each. The multi-RAT spatial multiplexing can for example be performed on one PRB, multiple PRBs or all PRBs in a RB at each TTI. According to the present application there may be RBs that are dedicated for LTE only and/or RBs that are dedicated for NR only and RBs that are shared in frequency, time and/or space domain.

For downlink wireless transmissions, the multi-RAT spatial multiplexing can be achieved by solving problem (1) shown below. The objective is to maximize sum of utility functions of all UEs, the utility is defined as proportional fair metric, $$U_i = \frac{\sum_{k=0}^{K_i} \gamma_{i,k}}{\bar{R}_i} = \frac{1}{\bar{R}_i} \sum_{k=0}^{K_i} \log\left(1 + \frac{b_{i,k} p_{ik}^{Rx} h_{i,k} F_{i,k}}{\sum_{i'} b_{i',k} p_{i',k}^{Rx} h_{i,k} F_{i',k} + N_0}\right),$$

and the objective is then problem 1:

$$\max_{b_{i,k}, F_{i,k}, \forall i, \forall k} \left( \sum_i \frac{1}{\bar{R}_i} \sum_{k \in K_i} \log\left(1 + \frac{b_{i,k} p_{ik}^{Rx} |h_{i,k}^T F_{i,k}|^2}{\sum_{i'} b_{i',k} p_{i',k}^{Rx} |h_{i,k}^T F_{i',k}|^2 + N_0}\right) \right)$$

-continued $$\text{s.t.} \begin{cases} 1.\ b_{i,k} \in \{0,1\}, \\ 2.\ K_i \in \{K_{LTE}^i, K_{NR}^i, K_{LTE+NR}^i, K_{LTE}^i \cup K_{LTE+NR}^i, K_{NR}^i \cup K_{LTE+NR}^i, \\ \quad K_{LTE}^i \cup K_{NR}^i \cup K_{LTE+NR}^i\}, \\ 3.\ \sum_i b_{i,k} \leq N, \\ 4.\ \sum_i \frac{1}{PL_i} \cdot \sum_{k \in K_{LTE}^i \cup K_{LTE+NR}^i}, b_{i,k} p_{i,k}^{Rx} \leq P_{MAX}^{LTE}, \\ 5.\ \sum_i \frac{1}{PL_i} \cdot \sum_{k \in K_{NR}^i \cup K_{LTE+NR}^i} b_{i,k} p_{i,k}^{Rx} \leq P_{MAX}^R, \\ 6.\ K_{LTE}^i \subset K_{LTE} \\ 7.\ K_{NR}^i \subset K_{NR} \\ 8.\ K_{LTE+NR}^i \subset K_{LTE+NR} \end{cases}$$

where $K_{LTE}$ is the set of resource blocks in which the network has the capability of the LTE technology only, $K_{NR}$ is the set of resource blocks in which the network has the capability of the NR technology only, $K_{LTE+NR}$ is the set of resource blocks in which the network has the capability of both LTE and NR technology, $h_{i,k} \in \mathbb{C}^{N \times 1}$ is channel vector (which is estimated), $F_{i,k} \in \mathbb{C}^{N \times 1}$ is pre-coding vector, $\bar{R}_i$ is average bit rate or moving average of the bit rate for UE i over a time period, $b_{i,k}$ is a binary allocation variable that RB k is allocated to UE I, $b_{i,k} p_{ik}^{Rx}$ is the received power on RB k to UE i, the sum over i' is the sum over all UEs except UE i, $K_{LTE}^i$ is the set of RBs that UE i can access in $K_{LTE}$, $K_{NR}^i$ is the set of RBs that UE i can access in $K_{NR}$, $K_{LTE+NR}^i$ is the set of RBs that UE i can access with the LTE or NR technology in $K_{LTE+NR}$, $K_i$ is the set of RBs that UE i can access based on the network capability and UE i capability (a UE can use $K_{LTE}^i$, $K_{NR}^i$, $K_{LTE+NR}^i$, $K_{LTE}^i \cup K_{LTE+NR}^i$, $K_{NR}^i \notin K_{LTE+NR}^i$ or $K_{LTE}^i \cup K_{NR}^i \cup K_{LTE+NR}^i$ set of RBs depending on its capability together with the network capability), N is the maximum spatial layers that the LTE/NR combined base station supports (N may be the number of antenna elements), $N_0$ is noise power spectral density, $PL_i$ is the pathloss of UE i, the term $$\frac{1}{PL_i} \cdot \sum_k b_{i,k} p_{i,k}^{Rx}$$

is the total transmit power used for UE i.

Solving the problem 1 gives us the optimal pre-coding matrix F* and spectrum allocations (i.e. the RBs) b* for all UEs on all RBs that maximize the system utility, i.e., $$\{b^*, F^*\} = \operatorname*{argmax}_{b_{i,k}, F_{i,k}, \forall i, \forall k \in K_i} \left( \sum_i \frac{1}{\bar{R}_i} \sum_{k \in K_i} \log\left(1 + \frac{b_{i,k} p_{ik}^{Rx} |h_{i,k}^T F_{i,k}|^2}{\sum_{i'} b_{i',k} p_{i',k}^{Rx} |h_{i,k}^T F_{i',k}|^2 + N_0}\right) \right)$$

with the same constraints as in problem 1.

Problem 1 involves binary variable $b_{i,k}$ and is hence non-convex and difficult to solve. In addition, LTE system has predefined discrete codebook for F* to choose from. It is assumed that NR will also have this.

A simple solution is proposed to solve problem 1. The problem is decoupled into two sub problems, sub-problem 1: optimizing $b_{i,k}$ with fixed $F_{i,k}$ and sub-problem 2: optimizing $F_{i,k}$ with fixed $b_{i,k}$.

$$b^* = \underset{b_{i,k}, \forall i, \forall k \in K_i}{\mathrm{argmax}} \left( \sum_i \frac{1}{R_i} \sum_{k \in K_i} \log \left( 1 + \frac{b_{i,k} p_{ik}^{Rx} |h_{i,k}^T F_{i,k}^*|^2}{\sum_{i'} b_{i',k} p_{i'k}^{Rx} |h_{i,k}^T F_{i',k}^*|^2 + N_0} \right) \right) \quad \text{Sub-problem 1}$$

$$F_{i,k}^* = \underset{F_{i,k}, \forall i, \forall k \in K_i}{\mathrm{argmax}} \left( \sum_i \frac{1}{R_i} \sum_{k \in K_i} \log \left( 1 + \frac{b_{i,k}^* p_{ik}^{Rx} |h_{i,k}^T F_{i,k}|^2}{\sum_{i'} b_{i',k}^* p_{i'k}^{Rx} |h_{i,k}^T F_{i',k}|^2 + N_0} \right) \right) \quad \text{Sub-problem 2}$$

Both sub-problems are still non-convex and difficult in their original forms. Sub-problem 1 can be relaxed and solved in Lagrange dual domain and then perform quantization on the solution. Sub-problem 2 can be solved by a greedy heuristic method, i.e. UE selects best precoding vector in its own interest and reports corresponding PMI to the network node.

Problem 1 is solved for a pre-defined time interval, typically every TTI of LTE or NR. The solution b* is a RB allocation strategy of the UEs to the RBs for the time interval. When UE i has $b^*_{i,k}=1$ and $k \in K_{LTE+NR}^i$ and another UE i'(i'≠i) has $b^*_{i',k}=1$ for the same RB k and UE i use LTE and UE i' use NR in RB k (simultaneously in time) then multi-RAT MIMO is enabled.

According to embodiments of the invention not only spectrum is shared between the first RAT and the second RAT but also power is shared between the first RAT and the second RAT. Power sharing may dynamically share a common output power transmission between network nodes 300a; 300b of the first RAT and the second RAT. Hence, power can be more efficiently used and power may be allocated to the technology and spectrum in which it is most needed.

Figure 13:
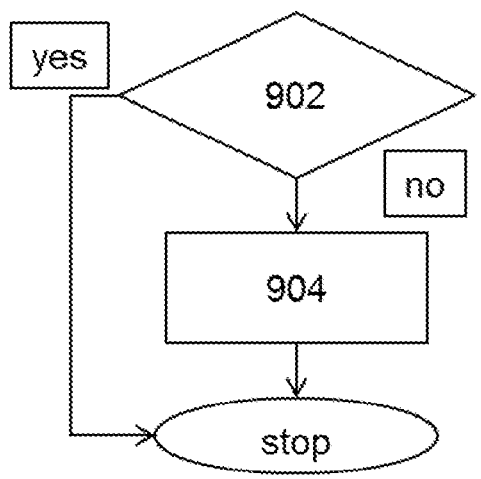
FIG. 13 shows a flow chart according to an embodiment of the invention.

FIG. 13 shows a flow chart of a method 900 for activating power sharing between the first RAT and the second RAT according to an embodiment. In step 902 it is checked if the first network node 300a and the second network node 300b has been allocated enough power to perform spatial multiplexing in respective spectrum. A network node 300a; 300b lacks power, i.e. is power limited, if it can send more bits on at least one of the allocated RBs if more power is available. If enough power to handle the bits to send has been allocated to the first network node 300a and the second network node 300b, power sharing is not necessary and the method 900 is stopped. On the other hand, if the first network node 300a or the second network node 300b are lacking power, power sharing according to the present application is performed. The power may be shared between the first RB and the common RB, between the second RB and the common RB, or between the first RB, the second RB and the common RB, as described below.

In an embodiment, the power to be shared is a first transmit power and the first transmit power is shared between the first RB and the common RB. The control device 100 is then configured to obtain a first transmit power for transmissions in the first RB and in the common RB. The control device 100 is further configured to allocate the first transmit power between the first RB and the common RB.

In an embodiment, the power to be shared is a second transmit power and the second transmit power is shared between the second RB and the common RB. The control device 100 is then configured to obtain a second transmit power for transmissions in the second RB and in the common RB. The control device 100 is further configured to allocate the second transmit power between the common RB and the second RB.

In an embodiment, the power to be shared is a total transmit power and the total transmit power is shared between the first RB, the second RB and the common RB. The control device 100 is then configured to obtain a total transmit power for transmissions in the first RB, in the second RB, and in the common RB. The control device 100 is further configured to allocate total transmit power between first RB, the common RB, and the second RB.

Power sharing according to the present application will now be described in an embodiment where the first RAT is LTE and the second RAT is NR. The basic concept is that if the network node 300a; 300b has the capability of both LTE and NR, the maximum transmit power constraint on a single RAT will be removed. Instead, a maximum transmit power constraint that is a sum transmit power of LTE and NR will be introduced. The sum transmit power constraint may then be described as problem 2:

$$\underset{b_{i,k}, F_{i,k}, \forall i, \forall k}{\max} \left( \sum_i \frac{1}{R_i} \sum_{k \in K_i} \log \left( 1 + \frac{b_{i,k} p_{ik}^{Rx} |h_{i,k}^T F_{i,k}|^2}{\sum_{i'} b_{i',k} p_{i'k}^{Rx} |h_{i,k}^T F_{i',k}|^2 + N_0} \right) \right)$$

$$\text{s.t.} \begin{cases} 1.\ b_{i,k} \in \{0, 1\}, \\ 2.\ K_i \in \{K_{LTE}^i, K_{NR}^i, K_{LTE+NR}^i, K_{LTE}^i \cup K_{LTE+NR}^i, K_{NR}^i \cup K_{LTE+NR}^i, \\ \quad K_{LTE}^i \cup K_{NR}^i \cup K_{LTE+NR}^i\}, \\ 3.\ \sum_i b_{i,k} \leq N, \\ 4.\ P_{MAX}^{LTE} + P_{MAX}^{NR} = P_{MAX} \\ 5.\ \sum_i \frac{1}{PL_i} \cdot \sum_{k \in K_i} b_{i,k} p_{i,k}^{Rx} \leq P_{MAX}^R, \\ 6.\ K_{LTE}^i \subset K_{LTE} \\ 7.\ K_{NR}^i \subset K_{NR} \\ 8.\ K_{LTE+NR}^i \subset K_{LTE+NR} \end{cases}$$

It can be seen that problem 1 is a special case of problem 2. The optimal value of problem 2 will be larger or equal to the optimal solution of problem 1. In other words, with power sharing according to the present application better system throughput can be achieved. This is possible since the different RATs can borrow power resource from each other in order to increase throughput.

Problem 2 can also be decoupled into two sub problems, sub-problem 3: optimizing $b_{i,k}$ with fixed $F_{i,k}$ in problem 2 above, and sub-problem 4: optimizing $F_{i,k}$ with fixed $b_{i,k}$ in problem 2 above.

Problem 2 estimates the required power per RB and per UE, if UE is allocated to the RB. The UEs are allocated to RBs such that the signal to noise ratio for each UE is maximized. It allows multiple UEs to be allocated to the same RB, and then these UEs share the RB by spatially multiplexing. If a UE is allocated to a resource when maximizing the signal to noise ratio then the estimated power for that UE in the RB is allocated to that UE. The network node 300a; 300b of the RAT that the UE belongs to gets this power "out of a pool of max power". In problem 2 there is a max power that can be shared by the first network node 300a and the second network node 300b. The power sharing is not only for the LTE/NR shared spectrum but also for LTE spectrum and NR spectrum. In problem 1 the network node 300a; 300b has a max power that it can use for UEs in LTE spectrum and in LTE/NR shared spectrum. In addition, the network node 300a; 300b has a max power that it can use for UEs in NR spectrum of the second RAT and in LTE/NR shared spectrum.

According to an embodiment the power resources may be allocated such that more power is allocated to resource blocks over which spatial multiplexing is done, i.e. over common RBs. In such an embodiment, RBs to which one UE is mapped are referred to as R1, RBs to which two UEs are mapped are referred to as R2, and RBs to which three UEs are mapped are referred to as R3. RBs that are using one layer, R1, gets p1 power units, RBs using two layers, R2, gets p2 power units, and RBs using three layers, R3, gets p3 power units, where p1<p2<p3. In general, this is more spectrum efficient than to allocate the same power over all RBs. For R1, power p1 is transmitted to each UE; for R2, power p2/2 is transmitted to each UE; and for R3, power p3/3 is transmitted to each UE. The sum of the power to be transmitted to LTE UEs over all RBs is the total LTE power. For LTE, all RBs are RBs of the LTE spectrum $K_{LTE}$ and RBs of shared LTE/NR spectrum $K_{LTE+NR}$. Similar calculation for NR gives the total NR power units. Total LTE power and total NR power are the power demand from each RAT.

Assuming that the power is shared proportionally then:

LTE gets: Max power*total LTE power units/(total LTE power units+total NR power units);

NR gets: Max power*total NR power units/(total LTE power units+total NR power units).

According to an embodiment the power may be allocated based on interference levels and channel quality. The received SINR at the UE side is estimated based on the channel quality information. With fixed SINR and block error rate targets for each UE (in LTE and NR spectrum), different transmit power spectral density is needed. To maximize the total system throughput, the transmit power spectral density is adaptively adjusted according to the interference level and channel quality.

The conventional single LTE and single NR maximum transmit power constraints are both relaxed. Instead, a total maximum transmit power constraint takes effect. Thus, LTE and NR are optimized as a whole instead of individuals. The degree of freedom of power allocation is thus enlarged.

If a transmit power increment in LTE spectrum is more beneficial than a transmit power increment in NR (even though LTE maximum transmit power constraint is violated), the transmit power will be increased in LTE and will be decreased in NR. The transmit power is borrowed from one RAT to another.

To be more specific, let $\Delta p$ denote the granularity of power amount to be borrowed and assume that total transmit power is about to be violated. The following method can be used for allocating power:

1. Spectrum and RB allocation decision is given from scheduler.
2. RB level SINR is predicted based on reference signals received power (RSRP) measurement in LTE and NR bands.
3. Calculate throughput increment (or decrement) $\Delta R_{LTE}$ for LTE band with $\Delta p$ increment in transmit power. Meanwhile calculate throughput increment (or decrement) $\Delta R_{NR}$ for NR band with $\Delta p$ increment in transmit power.
4. If $\Delta R_{LTE}>0>\Delta R_{NR}$, then LTE band should increase transmit power by $\Delta p$; If $\Delta R_{NR}>0>\Delta R_{LTE}$, then NR band should increase transmit power by $\Delta p$.
5. Step 3 and 4 will be repeated until total transmit power cannot be further increased, or if conditions $\Delta R_{LTE}<0$ and $\Delta R_{NR}<0$ are fulfilled.

Figure 14:
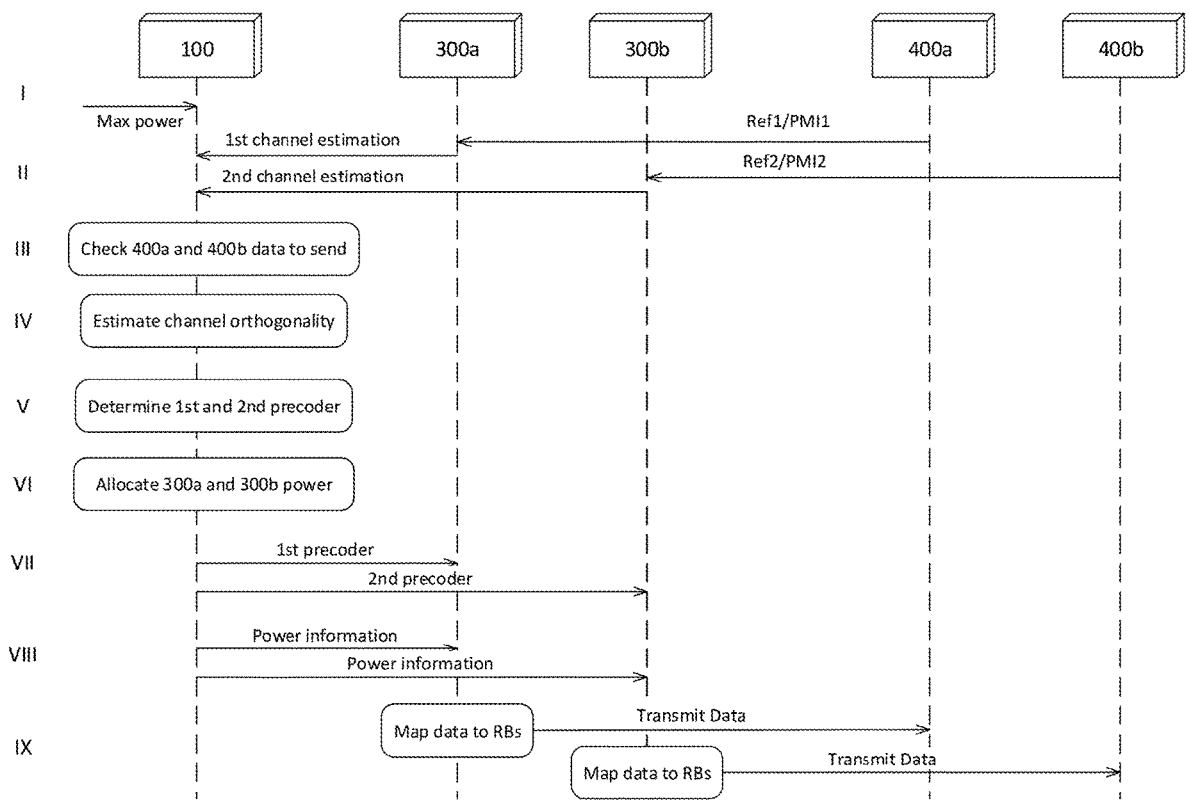
FIG. 14 shows a flow chart according to an embodiment of the invention.

FIG. 14 shows a flow chart of an embodiment of the invitation where the first network node 300a is a LTE radio access network (RAN) node and the second network node 300b is a NR RAN node. In addition, the first client device 400a is a LTE UE and the second client device 400b is a NR UE. FIG. 14 shows the following steps:

I. A max power available for LTE and NR together is configured in the control device 100, e.g. from an operation and maintenance system.

II. The first client device 400a sends uplink reference signals, e.g. SRS, and/or reports PMI to the first network node 300a. This is done in the LTE/NR shared spectrum. In the same way, the second client device 400b sends uplink reference signals, e.g. SRS and/or reports PMI to the second network node 300b. This is also done in the LTE/NR shared spectrum. Based on the received information the first network node 300a and the second network node 300b obtain a first channel estimation and a second channel estimation, respectively. The first channel estimation and the second channel estimation are sent as input to the control device 100. Additional input used by the control device may e.g. be:

a. Average bit rate or moving average of the bit rate over a time period per UE (this is not so essential input since it is assuming that special method called proportional fair is applied).

b. Estimated required received power on RB per UE if UE should be assigned the RB or estimated required transmitted power.

c. Poise power spectral density.

d. Pathloss per UE.

III. The control device 100 checks that there is both NR and LTE UEs that has data to send in the LTE/NR shared spectrum. If there are only LTE UEs that has data to send then control device 100 sends the task to schedule the UEs to the LTE RAN node, i.e. the first network node 300a in FIG. 14. The control device 100 indicates that the LTE RAN node can use all RBs in the shared spectrum and the procedure ends. In the same way, if there are only NR UEs that has data to send then the control device 100 sends the task to schedule the UEs to the NR base station, i.e. the second network node 300b in FIG. 14. The control device 100 indicates that the NR base station can use all RBs in the shared spectrum and the procedure ends. Note, these steps are not shown in FIG. 14. FIG. 14 instead shows the case where both the first client device 300a and the second client device 300b has data to send in the LTE/NR shared spectrum.

IV. The control device 100 then estimates the orthogonality between the UEs that has data to send, i.e. estimates the orthogonality between the first client device 300a and the second client device 300b in FIG. 14. Furthermore, the control device 100 allocates different RBs of the shared spectrum into three categories:

a. For LTE and NR UEs that can be spatially multiplexed it allocates common RBs.
b. For LTE UEs that cannot be spatially multiplexed with NR UEs it allocates RBs to be used for these UEs and sends the task to schedule these LTE UEs to the LTE RAN node.
c. For NR UEs that cannot be spatially multiplexed with NR UEs it allocates RBs to be used for these UEs and sends the task to schedule these NR UEs to the NR RAN node.

V. The control device 100 pairs the LTE and NR UEs that can be spatially multiplexed and determines the precoders per UE and per RB for LTE and NR UEs that are to be spatially multiplexed. In FIG. 14 this means that a first precoder is determined for the first client device 400a and a second precoder is determined for the second client device 400b.

VI. The control device 100 allocates power to the first network node 300a and the second network node 300b based on power sharing according to embodiments of the invention. The power allocation is based on input such as:
a. How much spatial multiplexing is planned in LTE spectrum from LTE RAN node.
b. How much spatial multiplexing is planned in LTE/NR shared spectrum for LTE UEs that are not multiplexed by NR UEs (sent from LTE RAN node).
c. How much spatial multiplexing is planned in NR spectrum from NR RAN node.
d. How much spatial multiplexing is planned in LTE/NR shared spectrum for NR UEs that are not multiplexed by LTE UEs (sent from NR RAN node).

VII. The control device 100 sends the task to schedule the LTE UEs to the LTE RAN node and the task to schedule the NR UEs to the NR RAN node. In FIG. 14 this is shown as the control device 100 sending the first precoder to the first network node 300a and the second precoder to the second network node 300b. The tasks to schedule also contains other information, such as e.g. layer mapping and resource block allocation.

VIII. The control device 100 sends information about the power, which has been allocated to the first network node 300a in step VI, to the first network node 300a and the control device 100 sends information about the power, which has been allocated to the second network node 300b in step VI, to the second network node 300b.

IX. The first network node 300a maps data to resource elements in the RBs for LTE UEs, including the first client device 400a. In the same way, the second network node 300b maps data to resource elements in the RBs for NR UEs, including the second client device 400b. The first network node 300a and the second network node 300b then transmits data to the first client device 400a and the second client device 400b, respectively, based on the mapping.

The client device 400a; 400b; . . . ; 400n herein may be denoted as a user device, a User Equipment (UE), a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

The network node 300a; 300b herein may also be denoted as a radio network node, an access network node, an access point, or a base station, e.g. a Radio Base Station (RBS), which in some networks may be referred to as transmitter, "eNB", "eNodeB", "NodeB" or "B node", depending on the technology and terminology used. The radio network nodes may be of different classes such as e.g. macro eNodeB, home eNodeB or pico base station, based on transmission power and thereby also cell size. The radio network node can be a Station (STA), which is any device that contains an IEEE 802.11-conformant Media Access Control (MAC) and Physical Layer (PHY) interface to the Wireless Medium (WM). The radio network node may also be a base station corresponding to the fifth generation (5G) wireless systems.

Furthermore, any method according to embodiments of the invention may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the control device 100 and the network node 300a; 300b comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, digital signal processors (DSPs), modem sharing devices (MSDs), trellis coded modulation (TCM) encoder, TCM decoder, power supply units, power feeders, communication interfaces, communication protocols, etc. which are suitably arranged together for performing the present solution.

Especially, the processor(s) of the control device 100 and the network node 300a; 300b may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present application is not limited to the embodiments described above, but also relates to and incorporates all embodiments within the scope of the appended independent claims.

What is claimed is:

1. A control device for a wireless communication system, the control device comprising:
a processor configured to:
obtain a first channel estimation for a first client device;
obtain a second channel estimation for a second client device;
allocate a common resource block (RB) for concurrent wireless transmission between a first network node and the first client device using a first radio access technology (RAT) and between a second network node and the second client device using a second RAT based on the first channel estimation and the second channel estimation, wherein the first RAT is different from the second RAT; and
allocate a first precoder for the common RB for the first client device and a second precoder for the common RB for the second client device based on at least one of the first channel estimation and second channel estimation,
wherein the first precoder and the second precoder are configured for spatially multiplexing the concurrent wireless transmission between the first network node and the first client device and between the second network node and the second client device in the common RB.

2. The control device according to claim 1, wherein the processor is further configured to:
receive a first reference signal from the first client device and obtain the first channel estimation based on the first reference signal;
receive a second reference signal from the second client device and obtain the second channel estimation based on the second reference signal; and
allocate the common RB if an estimated channel orthogonality between the first channel estimation and the second channel estimation is smaller than a channel orthogonality threshold value.

3. The control device according to claim 1, wherein the processor is further configured to:
receive a first precoder matrix indicator (PMI) from the first client device and obtain the first channel estimation based on the first PMI;
receive a second PMI from the second client device and obtain the second channel estimation based on the second PMI;
allocate the common RB if the first PMI is different from the second PMI.

4. The control device according to claim 1, wherein the processor is further configured to:
allocate a first RB for wireless transmission between the first network node and an additional client device using the first RAT; and
allocate a second RB for wireless transmission between the second network node and the additional client device using the second RAT.

5. The control device according to claim 4, wherein the first RB, the second RB, and the common RB do not overlap in frequency.

6. The control device according to claim 4, wherein the processor is further configured to:
allocate the first RB based on the first channel estimation and the second channel estimation; and
allocate the second RB based on the first channel estimation and the second channel estimation.

7. The control device according to claim 4, wherein the processor is further configured to:

allocate the common RB for payload transmission between the first network node and the first client device using the first RAT.

8. The control device according to claim 7, wherein the processor is further configured to:
allocate the first RB for transmission of control information between the first network node and the first client device using the first RAT, the control information being associated with the payload transmission between the first network node and the first client device in the common RB.

9. The control device according to claim 7, wherein the processor is further configured to:
allocate the second RB for transmission of control information between the second network node and the first client device using the second RAT, the control information being associated with the payload transmission between the first network node and the first client device in the common RB.

10. The control device according to claim 4, wherein the processor is further configured to:
allocate the common RB for payload transmission between the second network node and the second client device using the second RAT.

11. The control device according to claim 10, wherein the processor is further configured to:
allocate the first RB for transmission of control information between the first network node and the second client device using the first RAT, the control information being associated with the payload transmission between the second network node and the second client device in the common RB.

12. The control device according to claim 10, wherein the processor is further configured to
allocate the second RB for transmission of control information between the second network node and the second client device using the second RAT, the control information being associated with the payload transmission between the second network node and the second client device in the common RB.

13. The control device according to claim 4, wherein the processor is further configured to:
obtain a first transmit power for transmissions in the first RB and in the common RB;
allocate the first transmit power between the first RB and the common RB.

14. The control device according to claim 4, wherein the processor is further configured to:
obtain a second transmit power for transmissions in the second RB and in the common RB;
allocate the second transmit power between the common RB and the second RB.

15. The control device according to claim 4, wherein the processor is further configured to:
obtain a total transmit power for transmissions in the first RB, in the second RB, and in the common RB;
allocate the total transmit power between first RB, the common RB, and the second RB.

16. A network node for a wireless communication system, the network node comprising:
a processor configured to:
receive an allocation of a common resource block (RB) for concurrent wireless transmission between the network node and a first client device using a first radio access technology (RAT), and/or between the network node and a second client device using a second RAT, wherein the first RAT is different from the second RAT, receive an allocation of a first precoder and/or a second precoder for the common RB, wherein the first precoder and the second precoder are configured for spatially multiplexing concurrent wireless transmission in the common RB; and a transceiver configured to:
perform wireless transmission with the first client device in the common RB using the first RAT and the first precoder, and/or
perform wireless transmission with the second client device in the common RB using the second RAT and the second precoder.

17. A method for a control device, the method comprising:
obtaining a first channel estimation for a first client device;
obtaining a second channel estimation for a second client device;
allocating a common resource block (RB), for concurrent wireless transmission between a first network node and the first client device using a first radio access technology (RAT) and between a second network node and the second client device using a second RAT based on the first channel estimation and the second channel estimation, wherein the first RAT is different from the second RAT;
allocating a first precoder for the common RB for the first client device and a second precoder for the common RB for the second client device based on at least one of the first channel estimation and second channel estimation,
wherein the first precoder and the second precoder are configured for spatially multiplexing the concurrent wireless transmission between the first network node and the first client device and between the second network node and the second client device in the common RB.

18. A computer program stored on a non-transitory computer-readable medium, the computer program including a program code for performing a method according to claim 17 when the computer program runs on a computer.

* * * * *